US012624675B2

(12) United States Patent
Salter et al.

(10) Patent No.: US 12,624,675 B2
(45) Date of Patent: May 12, 2026

(54) USER DEVICE VEHICLE CHARGER STRATEGY

(71) Applicant: Ford Global Technologies, LLC, Dearborn, MI (US)

(72) Inventors: Stuart C. Salter, White Lake, MI (US); Jessica Louise Smith, Brighton, MI (US); Todd Ansbacher, Westland, MI (US); David Celinske, Wolverine Lake, MI (US); Brendan F. Diamond, Grosse Pointe, MI (US); Leann Kridner, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 18/895,593

(22) Filed: Sep. 25, 2024

(65) Prior Publication Data

US 2025/0188899 A1     Jun. 12, 2025

Related U.S. Application Data

(63) Continuation of application No. 18/533,594, filed on Dec. 8, 2023, now Pat. No. 12,123,384.

(51) Int. Cl.
| | |
|---|---|
| *F02N 11/08* | (2006.01) |
| *B60K 35/10* | (2024.01) |
| *B60R 16/033* | (2006.01) |

(52) U.S. Cl.
CPC ............ *F02N 11/084* (2013.01); *B60K 35/10* (2024.01); *B60R 16/033* (2013.01);
(Continued)

(58) Field of Classification Search
CPC .............. F02N 11/084; F02N 11/0822; F02N 2200/061; F02N 2200/10; F02N 11/08;
(Continued)

(56) References Cited

U.S. PATENT DOCUMENTS

| | | | |
|---|---|---|---|
| 8,972,152 B2 | 3/2015 | Boesch | |
| 9,108,633 B1 * | 8/2015 | Atluri | F02N 11/04 |

(Continued)

FOREIGN PATENT DOCUMENTS

| | | | |
|---|---|---|---|
| DE | 102017126648 A1 | 5/2018 | |
| RU | 2676923 C2 | 1/2019 | |
| WO | WO-2014181993 A1 * | 11/2014 | B60R 16/033 |

*Primary Examiner* — Joseph J Dallo
(74) *Attorney, Agent, or Firm* — Frank Lollo; Brooks Kushman P.C.

(57)     ABSTRACT

A depletion amount of energy required to charge a user device connected to a device port of a vehicle is estimated based on a state of charge (SoC) of a device battery of the connected user device. Responsive to an expected SoC of a LV battery of the vehicle after providing the depletion amount of energy exceeding a calibrated threshold amount of energy of the LV battery, the connected user device is charged during key off. Otherwise, an engine start/stop schedule defining a time to start an engine of the vehicle and a duration of run time for the engine is utilized to generate additional energy to charge the connected user device to ensure the LV battery remains above the calibrated threshold amount of energy.

25 Claims, 7 Drawing Sheets

100

(52) U.S. Cl.
CPC .... *F02N 11/0822* (2013.01); *B60K 2360/145* (2024.01); *F02N 2200/061* (2013.01); *F02N 2200/10* (2013.01)

(58) Field of Classification Search
CPC .............. B60K 35/10; B60K 2360/145; B60R 16/033; H01M 10/44; H01M 10/441; H02J 7/14; H02J 7/1407; H02J 7/1415; H02J 2207/40; H02J 7/50; H02J 7/82; H02J 7/80
See application file for complete search history.

(56) References Cited

U.S. PATENT DOCUMENTS

| | | | |
|---|---|---|---|
| 9,168,835 B2 | 10/2015 | Nordstrom et al. | |
| 10,503,232 B2 | 12/2019 | Lota | |
| 10,877,537 B1 | 12/2020 | Varughese et al. | |
| 11,414,031 B2 | 8/2022 | Vijithakumara | |
| 2010/0321025 A1* | 12/2010 | Lin ................... | H01M 10/4207 |
| | | | 324/427 |
| 2013/0116889 A1* | 5/2013 | Zhang ...................... | B60L 1/12 |
| | | | 320/109 |
| 2013/0187590 A1 | 7/2013 | Ferrel et al. | |
| 2014/0375118 A1* | 12/2014 | Namuduri ............. | B60R 16/033 |
| | | | 307/9.1 |
| 2018/0134176 A1 | 5/2018 | Symanow et al. | |
| 2019/0137940 A1 | 5/2019 | Jentz et al. | |
| 2019/0360380 A1* | 11/2019 | Dudar ....................... | F01P 7/14 |
| 2020/0298724 A1 | 9/2020 | Rhodes et al. | |
| 2023/0028274 A1* | 1/2023 | Kim ......................... | H04L 69/28 |
| 2023/0356606 A1* | 11/2023 | Cecconi .............. | H01M 50/213 |

* cited by examiner

300

400

112

600

604

Processor

608

Network Device

610

Output Device

612

Input Device

606

Storage

Computing Device
602

USER DEVICE VEHICLE CHARGER STRATEGY

CROSS-REFERENCE TO RELATED APPLICATIONS

This application is a continuation of U.S. application Ser. No. 18/533,594 filed Dec. 8, 2023, now issued as U.S. Pat. No. 12,123,384 on Oct. 22, 2024, the disclosure of which is hereby incorporated in its entirety by reference herein.

TECHNICAL FIELD

Aspects of the disclosure generally relate to strategies for charging user devices connected to the vehicle during key off.

BACKGROUND

A vehicle may be used to charge various devices. These devices may include cell phones or tablet computers. The devices may be connected to the vehicle's alternator and/or battery to receive power. This may be done, for instance, using wired universal serial bus (USB) connections or wireless charging pads.

SUMMARY

In one or more illustrative examples, a vehicle for charging user devices includes a device port configured to provide power from a low-voltage (LV) battery of the vehicle to a device battery of a connected user device and one or more controllers. The one or more controllers are configured to estimate a depletion amount of energy required to charge the connected user device based on a state of charge (SoC) of the device battery, responsive to an expected SoC of the LV battery after providing the depletion amount of energy exceeding a calibrated threshold amount of energy of the LV battery, charge the connected user device during key off, and otherwise, utilize an engine start/stop schedule defining a time to start an engine of the vehicle and a duration of run time for the engine to generate additional energy to charge the connected user device to ensure the LV battery remains above the calibrated threshold amount of energy.

In one or more illustrative examples, a method for charging user devices is provided. A depletion amount of energy required to charge a user device connected to a device port of a vehicle is estimated based on a state of charge (SoC) of a device battery of the connected user device. Responsive to an expected SoC of a LV battery of the vehicle after providing the depletion amount of energy exceeding a calibrated threshold amount of energy of the LV battery, the connected user device is charged during key off. Otherwise, an engine start/stop schedule defining a time to start an engine of the vehicle and a duration of run time for the engine is utilized to generate additional energy to charge the connected user device to ensure the LV battery remains above the calibrated threshold amount of energy.

In one or more illustrative examples, a non-transitory computer-readable medium comprising instructions for charging a user device that, when executed by one or more controllers of a vehicle, cause the one or more controllers to perform operations including to estimate a depletion amount of energy required to charge a user device connected to a device port of a vehicle based on a SoC of a device battery of the connected user device; responsive to an expected SoC of a LV battery of the vehicle after providing the depletion amount of energy exceeding a calibrated threshold amount of energy of the LV battery, charge the connected user device during key off; responsive to the expected SoC exceeding the calibrated threshold amount of energy and the vehicle being unauthorized to start an engine of the vehicle, charging the connected user device during key off until the LV battery reaches the calibrated threshold amount of energy; and otherwise, utilizing an engine start/stop schedule defining a time to start the engine of the vehicle and a duration of run time for the engine to generate additional energy to charge the connected user device to ensure the LV battery remains above the calibrated threshold amount of energy.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
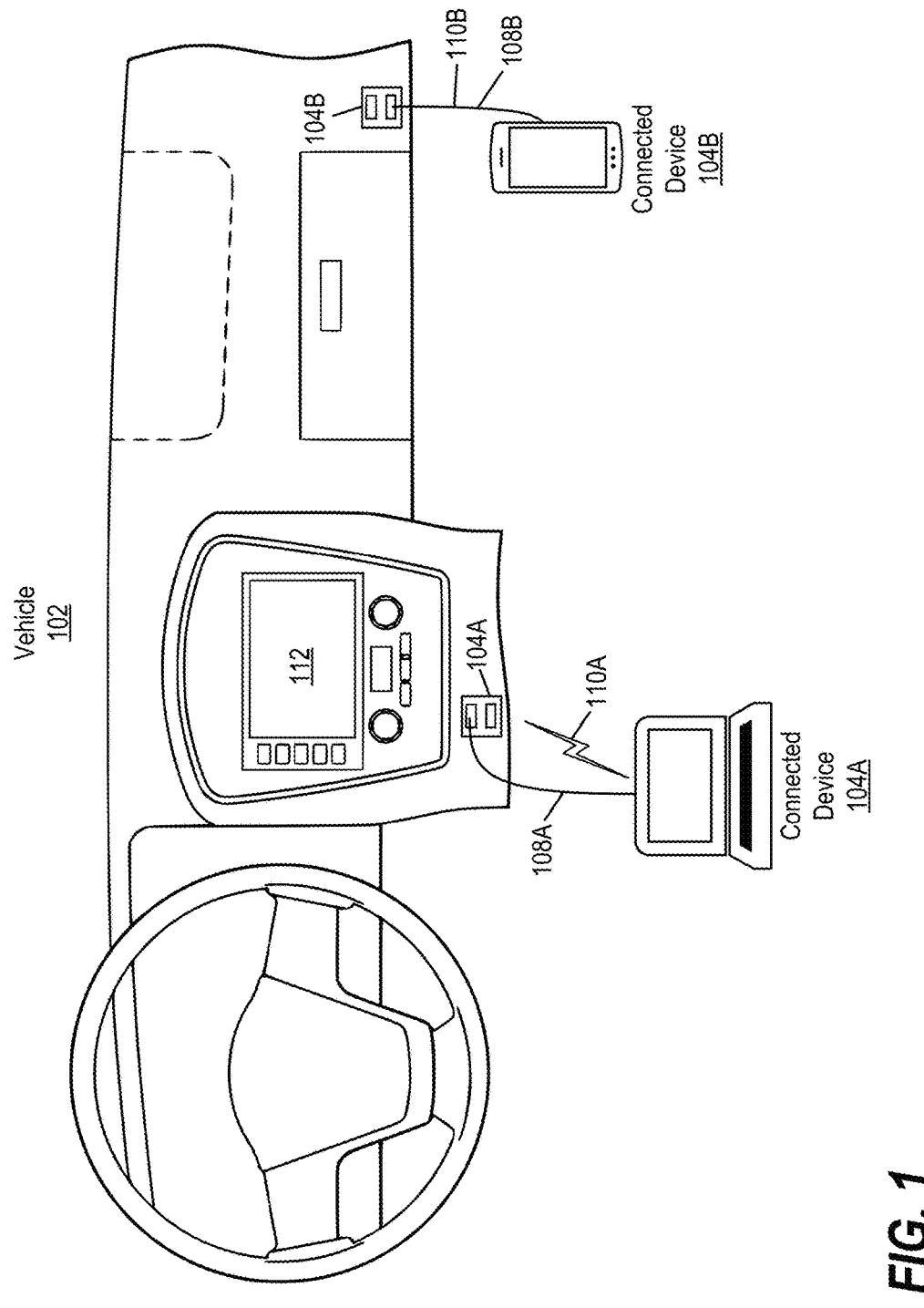
FIG. 1 illustrates an example portion of a vehicle configured to power user devices via device ports of the vehicle.

FIG. 1 illustrates an example portion of a vehicle 102 configured to power user devices 104 via device ports 106 of the vehicle 102. As shown, a first user device 104A is connected to a first device port 106A over a power connection 108A and a data connection 110A. Also as shown, a second user device 104B is connected to a second device port 106B over a power connection 108B and a data connection 110B. The vehicle 102 may also include a human machine interface (HMI) 112 to facilitate communication between the user and the vehicle 102. It should be noted that the types, locations, and quantities of the user devices 104 and device ports 106 are merely an example, and more, fewer, different types of user devices 104 and device ports 106 may be used.

The vehicle 102 may include various types of automobile, crossover utility vehicle (CUV), sport utility vehicle (SUV), truck, boat, plane or other mobile machine for transporting people or goods. In some cases, the vehicle 102 may be powered by an internal combustion engine (ICE). As a further possibility, the vehicle 102 may be a hybrid electric vehicle powered by both an internal combustion engine, a traction battery, and one or more electric motors. Hybrid vehicles 102 may come in various forms, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs), globally unique identifiers (GUIDs), customer or fleet accounts, etc.

The user devices 104 may include various brought-in devices that may be carried into the vehicle 102 interior by a user. Examples of such user devices 104 may include laptop computers, tablet devices, smartphones, smart rings or other wearables, personal digital assistants (PDAs), virtual reality (VR) headsets, smart speaker devices, as some non-limiting possibilities.

The device ports 106 may be of various types of electric port configured to provide power and/or data communication between the vehicle 102 and the user devices 104. As some non-limiting examples, the device ports 106 may be any of USB type-A, USB type-B, USB mini, USB micro, and/or USB type C ports. In another example, the device ports 106 may be a Lightning® port. In yet further examples, the device ports 106 may include other types of port such as 12V lighter ports, 120V appliance ports, etc.

A power connection 108 may be formed between a device port 106 of the vehicle 102 and the user device 104. The user device 104 may accordingly receive electrical power via the power connection 108. The power connection 108 may provide direct current (DC) or alternating current (AC) electric power to the user device 104. For example, a cable may have a charge connector for plugging into a respective device ports 106 of the vehicle 102 and a device power connector for connected to a port of the user device 104. Alternatively, the vehicle 102 may be configured to form a power connection 108 using wireless inductive coupling. This may be done to transfer power to the user device 104 wirelessly, without a cable.

A data connection 110 may also be provided between the user device 104 and the vehicle 102. The data connection 110 may provide for the communication of information between the user devices 104 and the vehicles 102. In some examples, such as shown for the first user device 104A, the data connection 110 may be a wireless data connection 110A such as a Wi-Fi connection, a Bluetooth connection, etc. In other example, such as shown for the second user device 104B, the data connection 110 may be a wired data connection 110B, e.g., over the same cable as the power connection 108. Further variations are possible, such as a wireless data connection 110 in combination with wireless inductive charging.

The HMI 112 may include various displays, such as a screen in a center stack of the vehicle 102 cabin. In some examples, the HMI 112 may also include one or more speakers for providing audio output to a user. The HMI 112 may also include facilities for receiving input, such as one or more buttons, controls, touch screens, microphones, etc.

Figure 2:
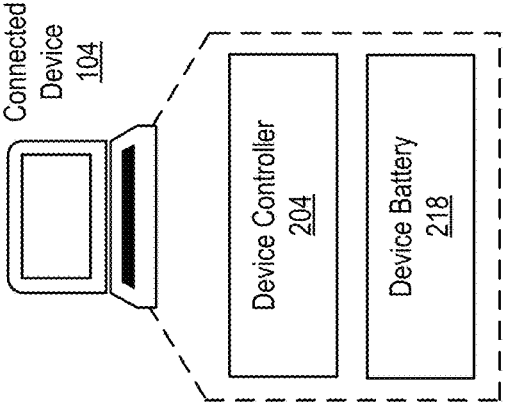
FIG. 2 illustrates further details of the vehicle and the user device.
Figure 2:
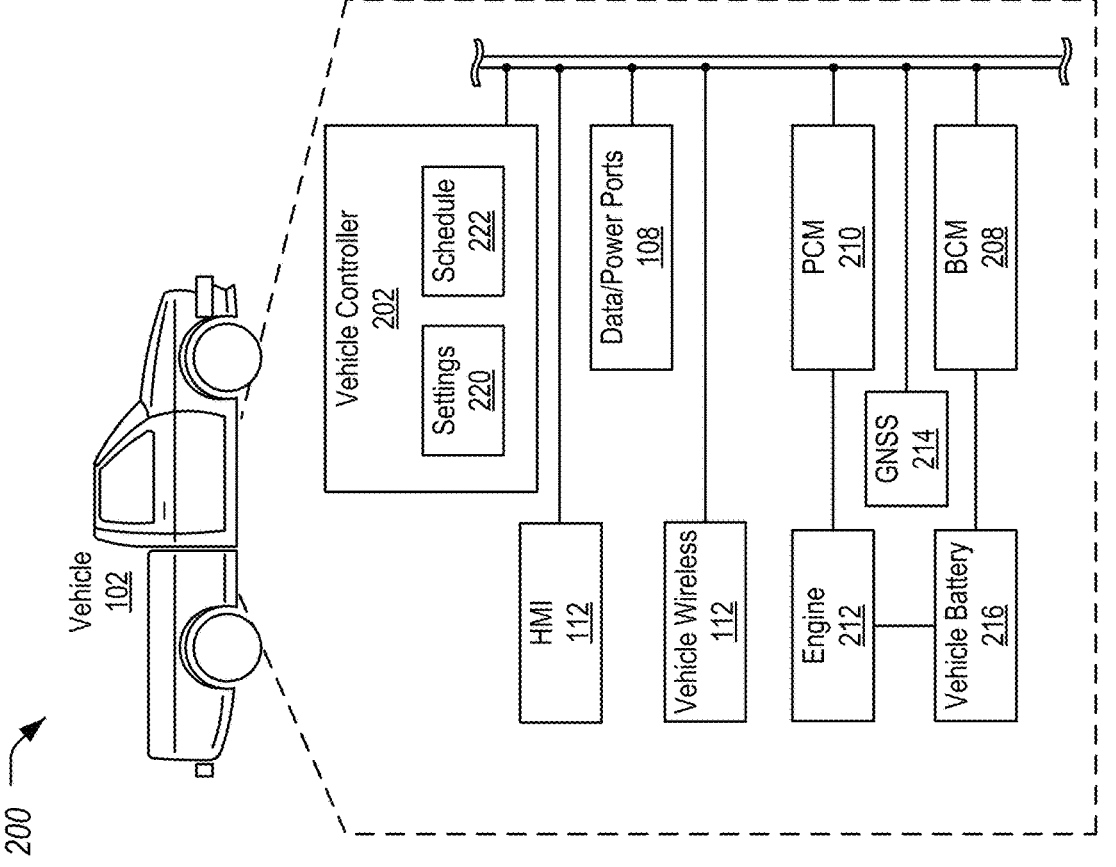

FIG. 2 illustrates further details of the vehicle 102 and the user device 104. As shown, the vehicle 102 and the user device 104 may each include circuitry and controls to manage the transfer of energy between the power source and the vehicle 102. Charging of the user device 104 may be controlled on the vehicle 102 side of the power connection 108 and data connection 110 via a vehicle controller 202. Charging of the user device 104 may be controlled on the user device 104 side of the power and wireless connections via a device controller 204. The vehicle controller 202 and device controller 204 may be any of various types of computing device including one or more processors configured to execute computer instructions, and a storage medium on which the computer-executable instructions and/or data may be maintained.

The device controller 204 may be further configured to communicate with other components of the vehicle 102 via in-vehicle networks 206. The in-vehicle networks 206 may include, but not limited to, one or more of a controller area network (CAN), an Ethernet network, and a media oriented system transfer (MOST) bus, as some examples. The in-vehicle network 206 may allow the device controller 204 to communicate with other vehicle systems, such as one or more electronic control units (ECUs). The ECUs may include, but not limited to, a body control module (BCM) 208, a powertrain control module (PCM) 210, and a global navigation satellite system (GNSS) controller 214.

The BCM 208 may be configured to connect to the vehicle controller 202 via the in-vehicle network 206 and monitor and control various electronic accessories in the body of vehicle 102. As an example, the BCM 208 may be configured to control the central locking, power windows, power mirrors, and device ports 106 of the vehicle 102.

The PCM 210 may be configured to connect to the vehicle controller 202 via the in-vehicle network 206. The PCM 210 may monitor and control the operation of the engine 212 and transmission, including the on, off, or accessory (ACC) status of the vehicle 102. In the on status, the vehicle 102 may be in a ready or a motive mode, and accessory functions such as the radio may be available. In the off status, the vehicle 102 motive capabilities may be disengaged and inaccessible without credentials. In the ACC status, accessories of the vehicle 102 may be available, but vehicle 102 motive capabilities may be disengaged and inaccessible.

The GNSS controller 214 may be configured to provide location services to the vehicle 102. In an example, the vehicle controller 202 may be configured to utilize the GNSS controller 214 to determine the location of the vehicle 102.

The vehicle 102 may further include a low-voltage (LV) battery 216. The LV battery 216 may be utilized to provide power to start the engine 212 of the vehicle 102. The LV battery 216 may also be utilized to provide power for low voltage electronics of the vehicle 102, such as the various ECUs (e.g., to power the vehicle controller 202, BCM 208, PCM 210, GNSS controller 214, etc.). The LV battery 216 may also serve as a source of power for the device ports 106.

The user device 104 may include a device battery 218. The device battery 218 may be configured to power the device controller 204 and/or the other components of the user device 104. Using the vehicle controller 202 and device controller 204, the vehicle 102 and user devices 104 may be configured to manage the transfer of energy between the LV battery 216 and the device battery 218.

The vehicle controller 202 may maintain settings 220 descriptive of various aspects of how to charge the device battery 218 from the LV battery 216. These settings 220 may define, as one example, the level of SoC to charge the device battery 218. These settings 220 may be configurable using the HMI 112 as discussed in detail herein.

The vehicle 102 may implement a charger strategy that leaves the device ports 106 on for a predefined period of time after key off or until the battery falls below a predefined state of charge (SoC). Such an approach may be acceptable for charging of user devices 104 such as phones. However, a more complete strategy may be desired to accommodate charging user devices 104 with greater power needs, such as laptops, to support the vehicle 102 as an office strategy.

To use USB device ports 106 as an example, 60 W chargers are presently available with a 5 A draw as well as 70 W chargers with a 5.8 A draw. Over five hours, usage of both of these chargers would incur a power usage of (5A+5.8 A)×5 hours=54 Ah. For an ICE vehicle 102 having a LV battery 216 of 68 Ah, use of this amount of power may result in a no start situation, even with the assumption that the low-voltage battery was fully charged. This estimate may be too optimistic, as the low-voltage battery it is typically charged to 80% SoC, not 100% SoC.

An enhanced approach to powering brought-in user devices 104 via the device ports 106 is discussed herein. During vehicle 102 key off, the vehicle 102 may monitor the status of the device ports 106 by determining if a user device 104 is present. The monitoring may be based on the discharge current at that device ports 106. The vehicle 102 may also use positional sensors, resistive based measurements, the interior sensor suite (interior cameras/radar), and/or continuity checks to monitor if a user device 104 is plugged into the device ports 106.

During key off, wired and/or wireless data connections 110 may be used to communicate with the connected user device 104 to determine the current SoC of the user device 104 as well as its battery size, max voltage, charge profile, etc. The vehicle 102 may use these inputs to estimate a total amount of energy to charge the user device 104 to a desired SoC/energy level.

The vehicle 102 may check the status of the SoC of the LV battery 216 to determine if the vehicle 102 is able to supply the energy to support powering the device port 106 to charge the user device 104. For instance, the vehicle 102 may subtract the requested power from the current SoC of the LV battery 216 to determine the expected SoC of the LV battery 216 after performing the powering. If the expected SoC is below a calibrated threshold amount of energy of the LV battery 216, then the vehicle 102 may lack sufficient power reserve to perform the charge. If so, the vehicle 102 may determine that it may be required to start the engine 212 to generate additional power. The vehicle 102 may determine how long the engine 212 will need to run to charge the LV battery 216 and/or the device battery 218 to the desired level. This information indicating when to start the engine 212 during keyoff and for how long to run the engine 212 may be referred to as an engine start/stop schedule 222. This determination may be based on the amount of energy that is needed to charge the user device 104.

Whether to charge the detected user devices 104 as well as how much to charge the user devices 104 may be specified by the user in the settings 220 of the vehicle 102.

Figure 3:
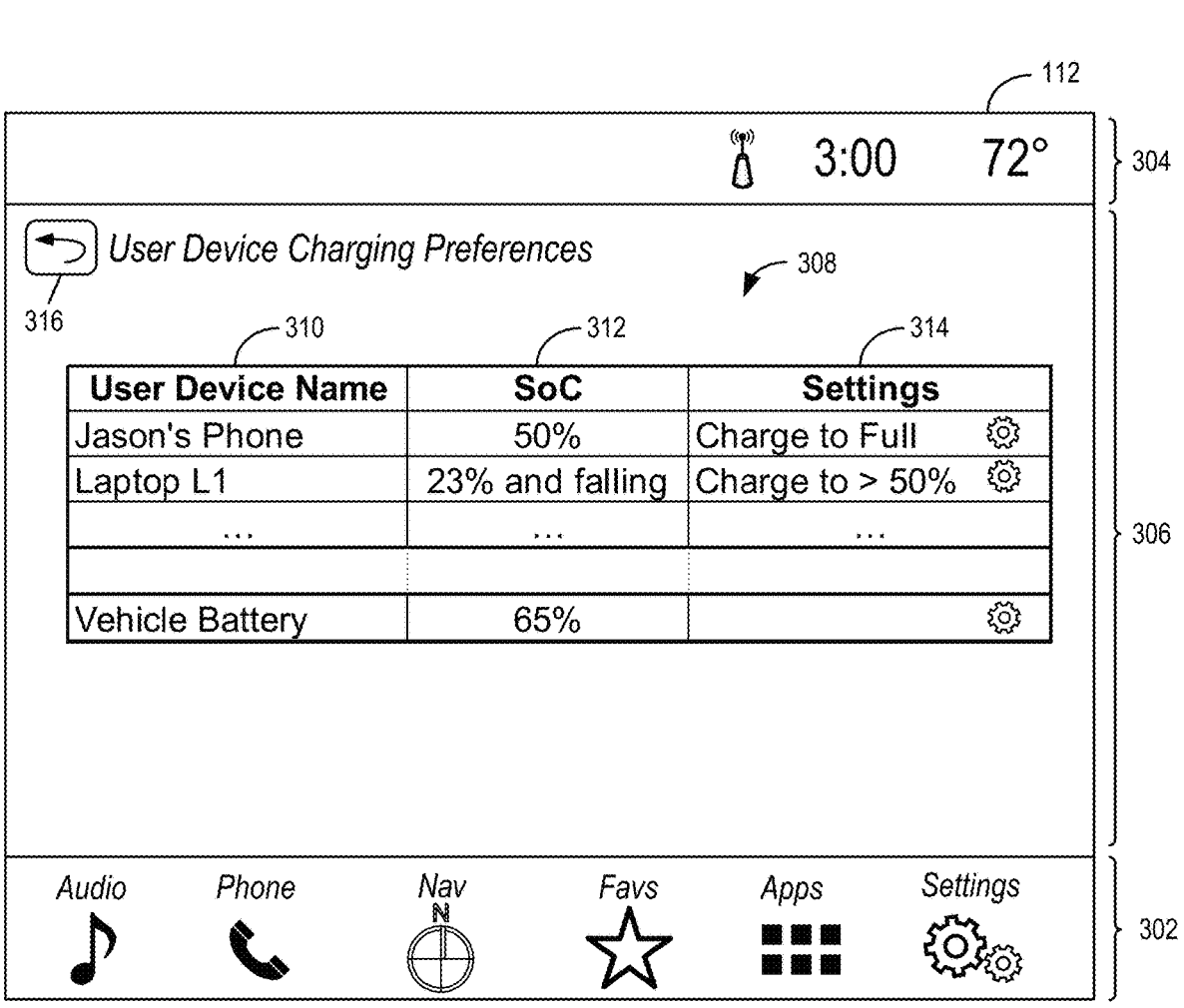
FIG. 3 illustrates an example of the vehicle displaying a user interface for requesting user consent to activate the engine while the vehicle is in an off mode.

FIG. 3 illustrates an example of the vehicle 102 displaying a user interface 300 illustrating the settings 220 for charging the user devices 104. The user interface 300 may be displayed on the head unit or other HMI 112 of the vehicle 102. In other examples, the user interface 300 may instead be displayed to one of the user devices 104 or to another user device 104 (e.g., a smartphone associated with user account corresponding to the vehicle 102).

As shown, the user interface 300 includes a category listing 302 of one or more screens of content to be displayed in a main screen area 306 of the HMI 112. As some examples, the category listing 302 may include an audio screen from which configuration of audio may be performed, a phone screen from which calling services may be utilized, a navigation screen from which maps and routing may be performed, a favorites screen from which items marked as favorites may be easily accessed, an applications screen from which installed applications may be invoked, a settings screen from which backlighting or other general settings of the HMI 112 may be accessed, and a features screen illustrating features of the vehicle 102. The user interface 300 may also include a general information area 304 from which time, current temperature, and other information may remain visible to the user, regardless of the specific screen or application that is active in the main screen area 306.

The user interface 300 provides a connected device listing 308 of the user devices 104 that are connected to the vehicle 102. For each of the user devices 104, the connected device listing 308 may indicate a name 310 of the user device 104, a charge status 312 of the user device 104, and a settings indication 314 for the charging of the user device 104. To adjust the settings 220, the user may select the corresponding icon for the user device 104. The connected device listing 308 may also include an entry for the LV battery 216, to allow the user to see the current SoC of the LV battery 216, as well as to adjust the settings 220 for charging the LV battery 216 as well.

The name 310 of the user device 104 may correspond to a name set for the user device 104 during pairing. The charge status 312 may indicate information descriptive of the state of charge of the user device 104 and/or information with respect to the user device 104 being charged by the vehicle 102 (e.g., whether the user device 104 is being charged, any settings 220 relating to the charge rate, timing, etc. for the charging of the user device 104 by the vehicle 102, etc.).

In the illustrated example, user devices 104 are shown as detected by the vehicle 102. The first user device 104 is a phone with a name 310 of Jason's Phone, a charge status 312 of 50%, and settings 220 indicating to charge the device to full SoC. The second user device 104 is a laptop with a name 310 of laptop L1, a charge status 312 of 23% and falling (e.g., indicating use), and settings 220 indicating to charge the device to at least 50% SoC.

The settings indication 314, when selected, allows the user to configure aspects of the charging of the user device 104. This may include, for example, when to start/stop charging a user device 104, such as options to start/stop charging a user device 104 based on time of day, power remaining on the user device 104, power remaining on the vehicle 102, etc. This information, once set, may accordingly be saved to the settings 220.

The user interface 400 may also include a go back control 316 that, when selected, allows the user to return to the previous screen that the user was interacting with. In the illustrated example, the go back control 316 may allow the user to return to the previous screen that was being interacted with.

The vehicle 102 may also determine if the vehicle 102 is authorized to start its engine 212 during key off based on monitoring the current operational state of the vehicle 102. Depending on the presence and quality of signals such as fuel level and location of the vehicle 102, the vehicle 102 may choose to require user input confirming that the engine 212 may be started. The vehicle 102 may also determine the GNSS location of the vehicle 102, determine if it is on public or private property, and reference local guidelines regarding starting the policies for starting the engine 212 to determine if the vehicle 102 can or cannot start the engine 212 based on location. In some cases, the vehicle 102 may require user consent to allow for the starting of the engine 212 in the off mode.

Figure 4:
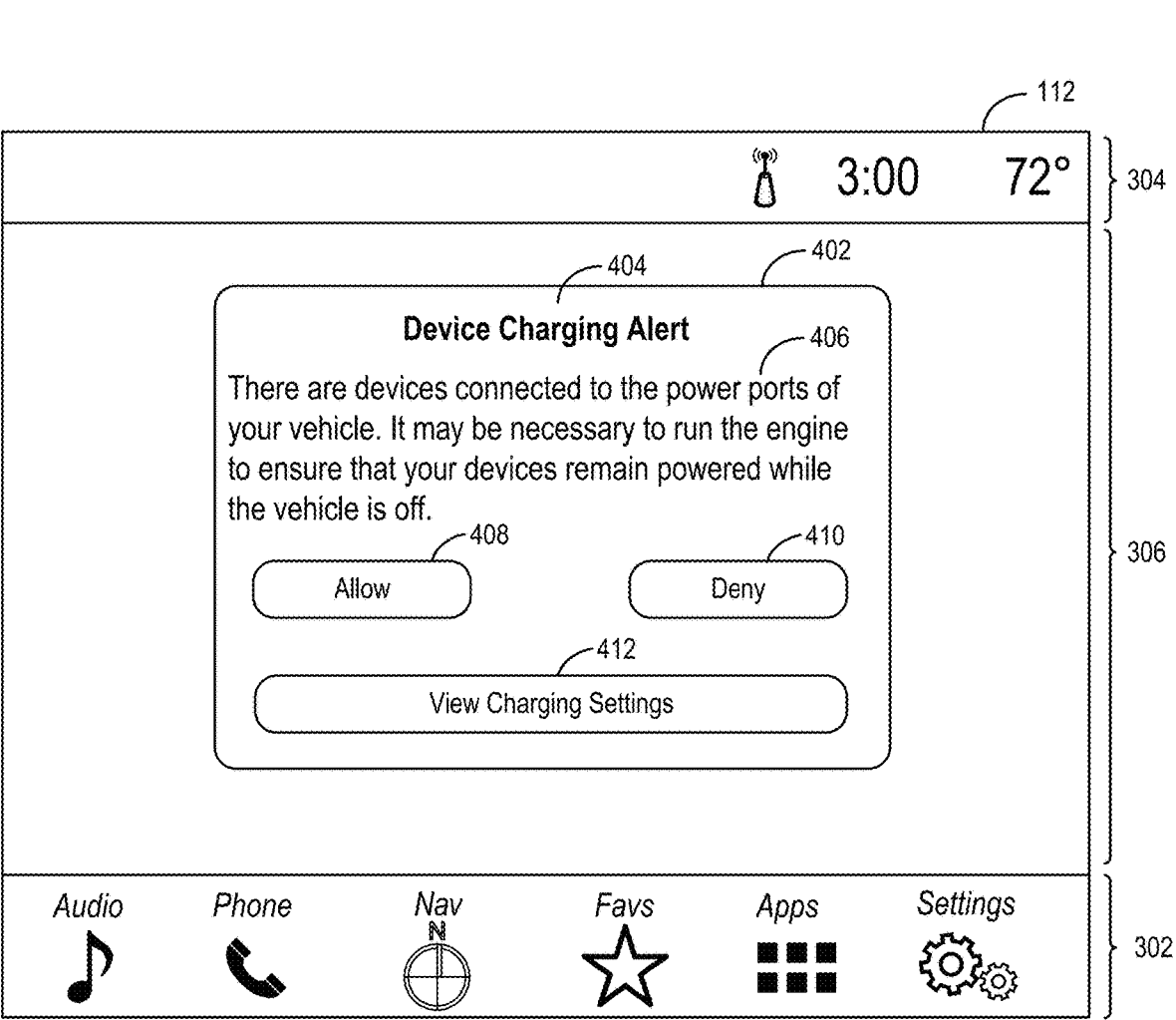
FIG. 4 illustrates an example of the vehicle displaying a user interface illustrating the settings for charging the user devices.

FIG. 4 illustrates an example of the vehicle 102 displaying a user interface 400 for requesting user consent to activate the engine 212 while the vehicle 102 is in an off mode. In an example, the user interface 400 may be displayed to the HMI 112 of the vehicle 102. It should be noted that in other examples, a similar interface (e.g., including a consent prompt 402) may instead be displayed to one of the user devices 104 or to another user device 104 (e.g., a smartphone associated with user account corresponding to the vehicle 102).

The consent prompt 402 may be overlaid on the user interface 400. The consent prompt 402 may include a title 404 indicating that a device charging alert is being displayed. The consent prompt 402 may also include message text 406 indicating that there are user devices 104 to the device ports 106 of the vehicle 102, and that it may be required to run the engine 212 to ensure that the user devices 104 remain powered while the vehicle 102 is off. The consent prompt 402 may also include an allow control 408 that, when selected by the user, grants the vehicle 102 the ability to start the engine 212 during the off mode, and a deny control 410, that when selected by the user, prevents the vehicle 102 from starting the engine 212 during the off mode. The consent prompt 402 may also include a settings control 412 that, when selected, allows for the configuration of the settings 220 for charging the user devices 104. For instance, responsive to selection of the settings control 412, the user interface 300 may be displayed.

The consent prompt 402 may be displayed in various situations, such as if the vehicle 102 is at a location requiring the user to consent to the engine 212 being started, if the fuel level of the vehicle 102 is below a predefined threshold level, etc.

Figure 5:
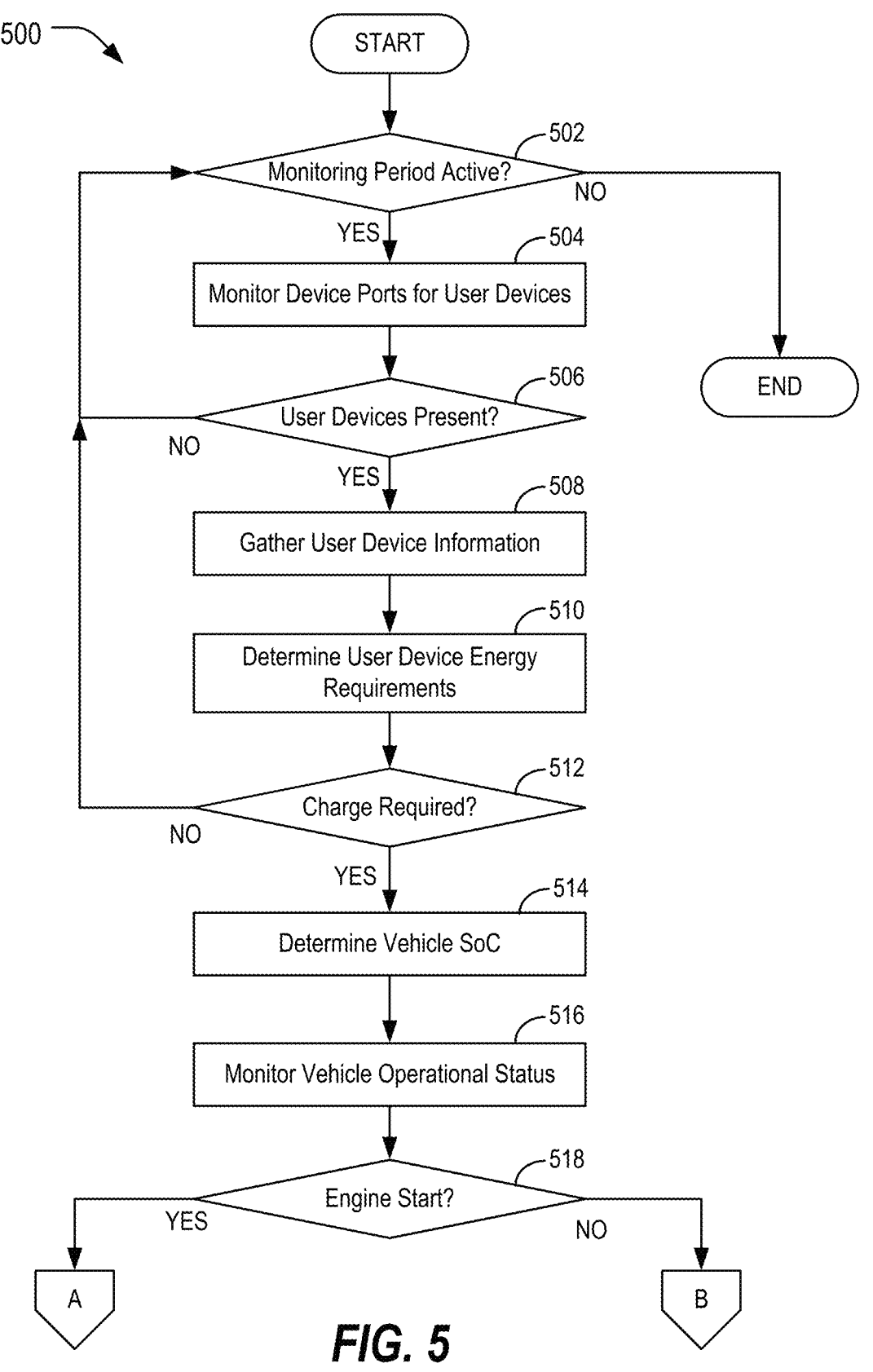
FIG. 5 illustrates an example process for the operation of the vehicle controller for providing power to the user device via the device ports.
Figure 5:
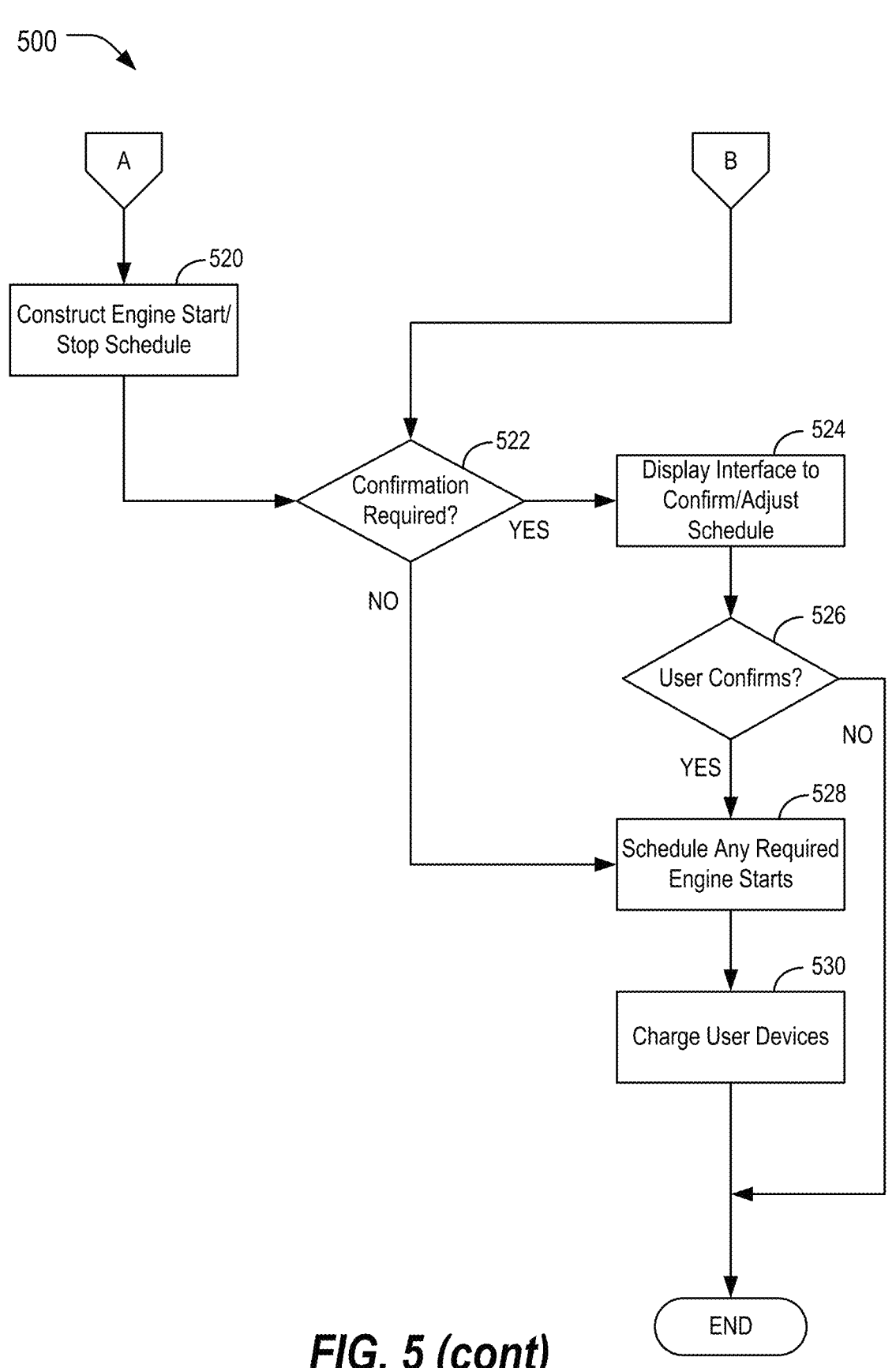

FIG. 5 illustrates an example process 500 for the operation of the vehicle controller 202 for providing power to the user device 104 via the device ports 106. In an example, the process 500 may be performed using the vehicle controller 202 and other components of the vehicle 102 as discussed in detail with respect to FIGS. 1-2. By using the process 500, a charger strategy may be implemented for the vehicle 102 that coordinates the power usage of the device ports 106 in the vehicle 102 with the user devices 104 that are being powered and/or charged, the LV battery 216 state of the vehicle 102, the ability of the vehicle 102 to start the engine 212, and the future route of the vehicle 102.

At operation 502, the vehicle 102 determines whether to monitor the vehicle 102 for user devices 104. In an example, a monitoring period may be initiated responsive to keyoff of the vehicle 102. The monitoring period may be performed for a predefined period of time after the keyoff. If the monitoring period is initiated and not expired, control proceeds to operation 504. If, however, no user devices 104 are detected within monitoring period, the vehicle 102 may turn off power to the device ports 106 and the process 500 ends.

At operation 504, the vehicle 102 monitors the device ports 106 for presence of user devices 104. The monitoring may be performed when the vehicle 102 is in the off state. During the time that the vehicle 102 is off, the vehicle 102 may monitor the status of the device ports 106 by determining if there is discharge current at the device ports 106. If so, it can be inferred that at user device 104 is connected.

Other approaches may additionally or alternately be used to monitor the device ports 106 for presence of user devices 104. As some examples, the vehicle 102 may use positional sensors, resistance-based measurements, the interior sensor suite of the vehicle 102 (e.g., interior cameras and or radar sensors for use in occupant detection, drowsiness determination, etc.), and continuity checks to monitor if a user device 104 is plugged into a device port 106.

At operation 506, the vehicle 102 determines whether one or more user devices 104 are present. If not, control returns operation 502. If there are user devices 104 detected, the vehicle 102 may proceed to operation 508 to determine the SoC of the user devices 104.

At operation 508, the vehicle 102 gathers information about the user devices 104. In an example, the vehicle 102 may utilize a data connection 110 to each user device 104 to communicate with the user device 104 to receive the size, max voltage, charge profile, current SoC, etc. of the device battery 218 of each of the user devices 104.

If information about the SoC of the user devices 104 cannot be provided due to the user device 104 being unable to communicate with the vehicle 102, the vehicle 102 may instead use other sensors such as interior cameras to identify the type of user device 104. Or, the vehicle 102 may receive user input via the HMI 112 to determine the expected maximum amount of energy to charge the user device 104, based on in battery size guidelines and/or estimations, e.g., assuming the device battery 218 is at a low initial SoC.

It should be noted that the gathering of information about the user devices 104 may include gathering information over time to identify trends in the usage of the user devices 104. For instance, the vehicle 102 may continue to monitor the SoC of the user device 104 over a period of time to identify usage and/or power drain on the user devices 104. If the SoC of the user device 104 is declining, e.g., due to use of the user device 104, the vehicle 102 may determine to maintain the SoC of the user device 104. The vehicle 102 may also monitor device usage though other approaches, such as Wi-Fi usage, mouse movement, via interior cameras of the vehicle 102 to determine if a user device 104 is still in use. Notably, this determination may be independent of whether there are occupants in the vehicle 102, as a user device 104 may be operating which may require the vehicle 102 to provide power via the device ports 106 even if no user is present.

At operation 510, the vehicle 102 determines the energy requirements of the user devices 104. In an example, the vehicle 102 may use the information gathered at operation 508 to sum a total amount of energy needed to charge all of the user devices 104 to the desired SoC and/or energy levels. This value may be referred to as a depletion amount of energy.

For instance, if the SoC of one of the user devices 104 is below a user input calibrated threshold for that user device 104, then the vehicle 102 may determine that the user device 104 requires to be charged. The depletion amount of energy may be determined to be the amount of energy required to cause the user device 104 to reach a predefined charge level (e.g., fully charged, to meet or exceed the user input calibrated threshold, to meet or exceed another threshold, etc.). In another example, if the SoC of the user device 104 is above the threshold but is decreasing in charge or otherwise being used, vehicle 102 may further account for this rate of draw in energy to determine the quantity of energy required to meet the threshold.

In some examples, charge SoCs may be defined in the setting 220 of the vehicle 102. The settings 220 may indicate the desired SoC of each of the different user devices 104. These SoCs may then be used to determine the amount of energy required for each connected user device 104.

At operation 512, the vehicle 102 determines whether charging of the user devices 104 is required. For instance, if the energy requirements determined at operation 510 are zero, then control may return to operation 502. This may occur, for example, it the SoC of each of the user device 104 is above a user input calibrated threshold and it is not being used and/or no discharge current for a period of time. If, once returning to operation 502, the monitoring period has elapsed, then the process 500 ends.

At operation 514, the vehicle 102 determines the SoC of the LV battery 216 of the vehicle 102 via the BCM 208. This may be used to determine if the LV battery 216 is able to supply the energy needed to support powering the device ports 106 to charge the user device 104.

The vehicle 102 may determine the expected SoC of the LV battery 216 by subtracting the SoC of the LV battery 216 determined at operation 514 from the depletion energy determined at operation 510. If the expected SoC falls below a calibrated minimum threshold SoC or results in a net change (depth of discharge) in SoC above a calibrated threshold, then an engine 212 start may be required. The threshold may be set, in an example, to ensure that the vehicle 102 may be restarted. If so, control proceeds to operation 516.

At operation 516, the vehicle 102 monitors the operational status of the vehicle 102. This may include monitoring of the fuel level of the vehicle 102, and/or monitoring the location of the vehicle 102. These aspects may be monitored to determine whether starting the engine 212 is permissible and/or requires user input confirming that the vehicle 102 is an open space and/or aligned with local guidelines before starting the engine 212.

For instance, the vehicle 102 may monitor the fuel level of the vehicle 102 via the PCM 210. This monitoring may include ensuring that idling the vehicle 102 to charge the LV battery 216 and/or user device 104 does not leave the vehicle 102 below a predefined fuel level (e.g., as defined in gallons, percent of capacity, range, etc.). In another example, the vehicle 102 may monitor the SoC of the LV battery 216 to ensure that a calibrated threshold minimum amount of energy remains in the LV battery 216. This may be done to confirm that the LV battery 216 is able to restart the engine 212.

The vehicle 102 may also monitor its location via the GNSS controller 214. For instance, the vehicle 102 may determine whether the vehicle 102 is located in an enclosed space. This determination may be made based on various approaches, such as via comparing the GNSS location received from the GNSS controller 214 to geofences indicating enclosed spaces, via user input, or and/or via the sensor suite of the vehicle 102 determining that the vehicle 102 is within an enclosed area (e.g., via image recognition of images captured by the vehicle 102). The vehicle 102 may use the GNSS location of the vehicle 102 to determine whether the vehicle 102 it is on public or private property and may reference local guidelines regarding policies for starting the engine 212 of the vehicle 102 to determine whether the vehicle 102 is allowed to start the engine 212 based on its location.

At operation 518, the vehicle 102 determines whether an engine 212 start is required. For instance, if the vehicle 102 is in a location where an engine 212 start is allowed, and or the fuel level is sufficient that the vehicle 102 is able to idle the engine 212 without losing required range, the vehicle 102 may determine to perform an engine 212 state. If so, control proceeds to operation 520. If not, control proceeds to operation 522.

At operation 520, the vehicle 102 constructs the engine start/stop schedule 222. This engine start/stop schedule 222 may include for how long to turn the engine 212 on, as well as when to turn the engine 212 on.

With respect to the quantity of time to run the engine 212, based on the amount of energy that is needed, and the net amount of energy that is generated into the LV battery 216 via the alternator of the engine 212 when the engine 212 is on, the vehicle 102 may determine the amount of time that the engine 212 needs to run to fill the deficiency in available SoC. In some examples, the settings 220 of the vehicle 102 may define a maximum amount of runtime for the engine 212 for generating additional energy.

In some examples, if the LV battery 216 is at a lower SoC, then the amount of time to run the engine 212 may be increased to additionally provide for charging the LV battery 216 to a higher SoC to gain a side benefit of refreshing the LV battery 216 as extending an idle cycle may be over an additional start being required later on. Also, charging the LV battery 216 to higher SoC may provide a buffer in the power budget for charging the user devices 104. Or if the weather is cold, then additional engine 212 run time may be preferred to ensure the vehicle 102 does not become too cold, and/or to add additional power budget to ensure the vehicle 102 may be started.

In another example, the vehicle 102 may determine an expected travel time and/or an expected engine 212 on time during the next route, and/or whether the next driving opportunity is a short trip or is a longer trip that may allow the user devices 104 to be charged. For instance, the vehicle 102 may use artificial intelligence (AI) or machine learning (ML) to determine the length of the next trip based on the user's historical usage of the vehicle 102. The historical usage used to identify patterns may include a history of the origin and destination locations of the vehicle 102 over time, day, season, etc., as well as including other factors such as detected occupants, detected user devices 104, etc., that may correlate with shorter or longer trips. The determination of the expected length of the trip may be used to increase or decrease the amount of time to run the engine 212. For instance, if only a short trip is anticipated, then the run time may be longer than if a longer trip is activated.

With respect to when to turn the engine 212 on, the vehicle 102 may determine the timing based on factors such as an expected time that the vehicle 102 is anticipated to remain at the present location, an expected travel time and/or an expected engine 212 on time during the next route of the vehicle 102, whether the next driving opportunity is a short trip or a longer trip, and how recently the engine 212 was last used.

For instance, if the engine 212 was recently run and is already warm, then the engine 212 may be likely to operate more efficiently if restarted sooner than later. If so, the vehicle 102 may determine to start the engine 212 immediately as opposed to waiting for the engine 212 to cool and become less efficient. Or, if the engine 212 is cold and the SoC of the LV battery 216 is high, then the engine 212 start in the engine start/stop schedule 222 may be set later in time. This may be advantageous, as the user may come back to the vehicle 102 and manually start it before the scheduled start time in the engine start/stop schedule 222, thereby obviating the extra engine 212 start.

In another example, the vehicle 102 may determine an expected time away from the vehicle 102 for the user. This may be inferred through an analysis of patterns of historical usage of the vehicle 102 and/or user input. For instance, similar to as noted above, the vehicle 102 may ML techniques to determine an expected time at a stopped location. Again, this may be advantageous, as the user may come back to the vehicle 102 and manually start it before the start time in the, thereby obviating the extra engine 212 start.

At operation 522, the vehicle 102 determines whether user confirmation is required to allow the engine 212 to be started. For instance, if the location of the vehicle 102 is subject to local guidelines that require the vehicle 102 to confirm before the engine 212 is started, control passes to operation 524 to receive the confirmation. Or, if the location of the vehicle 102 is determined to potentially be indoors, control passes to operation 524 to receive the confirmation. Or, if the settings 220 of the vehicle 102 require the vehicle 102 to confirm before the engine 212 is started, control proceeds to operation 524. Or, if the settings 220 define a maximum amount of runtime for the engine 212 for generating additional energy, then confirmation may be required to override this maximum and/or to alert the user that the full amount of energy that is desired for charging the user devices 104 is unavailable.

At operation 524, the vehicle 102 displays an interface for confirming the charging of the user devices 104. This interface may be used to receive the consent to activate the engine 212 while the vehicle 102 is off. An example of such an interface is the user interface 300 discussed above with respect to FIG. 3. In some examples, the vehicle 102 displays an interface for confirming the settings 220 to use to change the user devices 104. An example of such an interface is the user interface 400 discussed above with respect to FIG. 4, which may also be activated be pressing the settings control 318 of the consent user interface 300.

At operation 526, the vehicle 102 determines whether consent is received. If the user provides consent to activate the engine 212, e.g., by selecting the allow control 408, control proceeds to operation 528 to perform the engine start/stop schedule 222 of determined engine 212 starts and then to operation 530 to charge the user devices 104 via the device ports 106. The vehicle 102 may accordingly charge the user devices 104 accordance with the approved settings 220. If consent is not received, the process 500 ends without charging the user devices 104.

Variations on the process 500 are possible. In an example, if the vehicle 102 recognizes that a user device 104 is connected to the vehicle 102 while driving to a specific location, the vehicle 102 may preemptively charge the LV battery 216 to a higher set point/SoC as to allow for a large initial buffer.

In another example, if the engine 212 is expected to be needed for charging, the vehicle 102 may provide the customer with choices of engine 212 operation to charge the user device 104 based on different user device 104 SoC levels or amount of time spent charging the user device 104. For instance, purely for sake of example, the HMI 112 may indicate that to charge the user device 104 for thirty minutes may require X minutes of engine 212 run time, Y gallons of fuel, etc. Or, the HMI 112 may indicate that to charge the user device 104 to an SoC of 80% may require Z minutes of engine 212 run time. The customer may be informed via the HMI 112 of implications of the solutions presented, e.g., in terms of the engine idle time, 12V SoC, SoC of the user device 104, etc. If there are multiple possibilities, the customer may utilize the HMI 112 to indicate their choice from the presented information.

In another example, the HMI 112 may present an option to provide as much charging of the user device 104 as possible without starting the engine 212 (e.g., where factors such as depth of discharge/LV battery 216 SoC/LV battery 216 discharge capability may be a limiting factor).

In another example, the vehicle 102 may delay an engine 212 start or delay device charging after engine 212 start until the engine 212 is operating at a more efficient state to reduce stress on the LV battery 216.

In another example, a priority of charging of the user devices 104 may be specified by the user as to enable/disable this feature, e.g., always charge when possible or charge selectively to reduce fuel consumption and/or promote battery life.

In another example, the setting 220 may define multiple different SoC charge thresholds for each user device 104. For instance, if the vehicle 102 expects to be driven soon, it may charge the devices to a first SoC and wait for the vehicle 102 to be driven until charging to the second SoC. The SoCs may be defined by the user or may be based on the charge time for the device and expected drive time.

In another example, if the SoC of the LV battery 216 is high and is able to support the user device 104 charging and/or operation for an extended period of time (e.g., at least one hour), the vehicle 102 may defer any engine 212 start as to hopefully allow the user to return to drive the vehicle 102 away. The threshold time to defer the engine 212 start may be modified in the settings 220.

In another examples, if the total engine 212 run time is above a predefined threshold, the vehicle 102 may communicate the engine 212 run time to the user to have the user make a decision regarding whether to charge the user device 104 to a lower level or to limit the engine 212 run time.

In another example, if the engine 212 needs to be started to charge the user device 104, the vehicle 102 may choose when to start the engine 212 to minimize the number of engine 212 starts and/or total engine 212 run time and to minimize the number of cold engine 212 starts. If the engine 212 is already warm and the LV battery 216 is low and/or could be charged to a higher level, or if the LV Battery 216 has a degraded health and/or minimal discharge capability (e.g., due to cold weather for instance), the vehicle 102 may start the engine 212 and charge the LV battery 216 and user device 104 simultaneously. In many examples, extending the idle before turning off the engine 212 may be preferred and recommend over a later restart.

In another example, the LV battery 216 may also be charged to a higher than normal SoC. For instance, if 80% is a default for the LV battery 216 then the LV battery 216 may be charged to a higher SoC such as 85% or 90%, as the user device 104 will draw down this excess SoC to charge its device battery 218.

Figure 6:
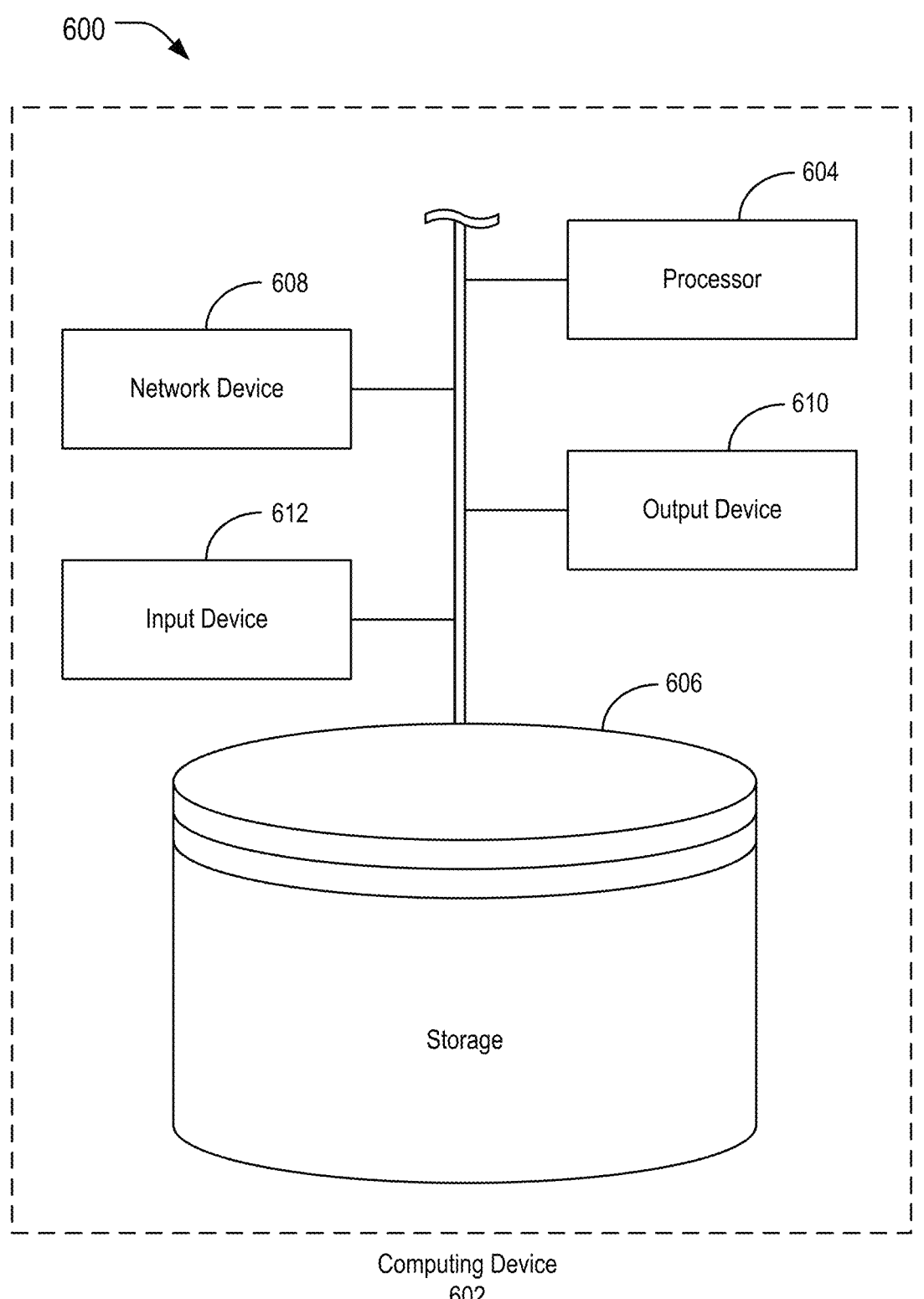
FIG. 6 illustrates an example computing device for use in the charging of user devices by a vehicle.

FIG. 6 illustrates an example computing device 602 for use in the charging of user devices 104 by a vehicle 102. Referring to FIG. 6, and with reference to FIGS. 1-5, the vehicles 102, user devices 104, HMIs 112, vehicle controllers 202, device controllers 204, BCMs 208, and PCMs 210 generally include computer-executable instructions, where the instructions may be executable by one or more computing devices 602. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as the signals transmitted over the data connections 110, and settings 220 for charging the user devices 104 may be stored and transmitted using a variety of computer-readable media.

As shown, the computing device 602 may include a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip that integrates the functionality of the CPU and GPU. The SoC may optionally include other components such as, for example, the storage 606 and the network device 608 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raise-able device that may, in an example, be configured to display braille or another physical output that may be touched to provide information to a user.

The input device 612 may include any of various devices that enable the computing device 602 to receive control input from users. Examples of suitable input devices 612 that receive human interface inputs may include keyboards, mice, trackballs, touchscreens, microphones, graphics tablets, and the like.

The network devices 608 may each include any of various devices that enable the described components to send and/or receive data from external devices over networks. Examples of suitable network devices 608 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle for charging user devices, comprising:
a plurality of device ports each configured to provide power from a low-voltage (LV) battery of the vehicle to a device battery of a respective connected user device; and
one or more controllers, configured to:
    monitor for presence of a plurality of connected user devices,
    estimate a depletion amount of energy required to charge the plurality of connected user devices based on a sum of a state of charge (SoC) of the respective device batteries, responsive to an expected SoC of the LV battery after providing the depletion amount of energy exceeding a calibrated threshold amount of energy of the LV battery, charge the plurality of connected user devices during key off, and otherwise, utilize an engine start/stop schedule defining a time to start an engine of the vehicle and a duration of run time for the engine to generate additional energy to charge the plurality of connected user devices to ensure the LV battery remains above the calibrated threshold amount of energy.

2. The vehicle of claim 1, wherein the one or more controllers are further configured to, responsive to the expected SoC exceeding the calibrated threshold amount of energy and the vehicle being unable to start the engine, charge the plurality of connected user devices during key off until the LV battery reaches the calibrated threshold amount of energy.

3. The vehicle of claim 1, wherein the one or more controllers are further configured to, responsive to the duration of run time for the engine exceeding a predefined threshold amount of time, display a consent prompt to a human machine interface (HMI) to confirm to allow the engine to run for the duration of run time.

4. The vehicle of claim 1, wherein the one or more controllers are further configured to determine presence of at least one of the plurality of connected user devices by monitoring discharge current at the plurality of device ports.

5. The vehicle of claim 1, wherein the one or more controllers are further configured to determine presence of at least one of the plurality of connected user devices by monitoring one or more of: positional sensors, resistive based measurements, interior cameras, and/or interior radar.

6. The vehicle of claim 1, wherein the one or more controllers are configured to receive information indicative of the SoC of the device batteries over respective data connections between the plurality of connected user devices and the one or more controllers.

7. The vehicle of claim 1, wherein the one or more controllers are further configured to:

determine a location of the vehicle using a global navigation satellite system (GNSS) controller;

responsive to the location requiring user input to confirm that the vehicle can be remotely started during key off, display a consent prompt to a human machine interface (HMI); and utilize the engine start/stop schedule responsive to receiving permission via the consent prompt to start the engine during key off.

8. The vehicle of claim 1, wherein the one or more controllers are further configured to:

detect presence of the plurality of connected user devices during key on of the vehicle; and charge the LV battery to a level of SoC exceeding a default key off SoC of the LV battery, to increase the expected SoC of the LV battery during key off.

9. The vehicle of claim 1, wherein the one or more controllers are further configured to:

responsive to an expected future trip for the vehicle, defer a start time of the engine start/stop schedule until a predefined minimum period of time from key off.

10. The vehicle of claim 1, wherein the one or more controllers are further configured to display a settings interface to an HMI, the settings interface allowing for configuration of one or more of:

a start time of the engine for the engine start/stop schedule;

a run time of the engine for the engine start/stop schedule; or a SoC to charge the LV battery.

11. The vehicle of claim 10, wherein the settings interface further includes an option to charge the plurality of connected user devices as much as possible without starting the engine.

12. The vehicle of claim 1, wherein the one or more controllers are further configured to display a settings interface to an HMI, the settings interface allowing for separate configuration of charging preferences for each of the plurality of connected user devices.

13. The vehicle of claim 12, wherein the settings interface indicates, for each of the plurality of connected user devices, a SoC to charge the respective connected user device.

14. The vehicle of claim 12, wherein the settings interface indicates, for each of the plurality of connected user devices, a current SoC of the respective connected user device.

15. The vehicle of claim 1, wherein the one or more controllers are further configured to:

display, to an HMI, a plurality of options in the engine start/stop schedule, each option indicating a different device SoC level or amount of time to charge each of the plurality of connected user devices;

receive a selection of one of the plurality of options; and utilize the engine start/stop schedule to charge the plurality of connected user devices based on the selected one of the plurality of options.

16. A method for charging user devices, comprising:

estimating a depletion amount of energy required to charge a plurality of user devices connected to a plurality of device ports of a vehicle based on a sum of state of charge (SoC) of device batteries of the plurality of connected user devices;

responsive to an expected SoC of a LV battery of the vehicle after providing the depletion amount of energy exceeding a calibrated threshold amount of energy of the LV battery, charge the connected plurality of user devices during key off; and otherwise, utilizing an engine start/stop schedule defining a time to start an engine of the vehicle and a duration of run time for the engine to generate additional energy to charge the connected plurality of user devices to ensure the LV battery remains above the calibrated threshold amount of energy.

17. The method of claim 16, further comprising, responsive to the expected SoC exceeding the calibrated threshold amount of energy and the vehicle being unable to start the engine, charging the plurality of connected user devices during key off until the LV battery reaches the calibrated threshold amount of energy.

18. The method of claim 16, further comprising, responsive to the duration of run time for the engine exceeding a predefined threshold amount of time, displaying a consent prompt to a human machine interface (HMI) to confirm to allow the engine to run for the duration of run time.

19. The method of claim 16, further comprising one or more of:

determining presence of the plurality of connected user devices by monitoring discharge current at the device port;

determining presence of the plurality of connected user devices via a data connection to the connected user device connected to the device port; and/or receiving information indicative of the SoC of the device battery over the data connection.

20. The method of claim 16, further comprising:

determining a location of the vehicle using a global navigation satellite system (GNSS) controller;

responsive to the location requiring user input to confirm that the vehicle can be remotely started during key off, displaying a consent prompt to a human machine interface (HMI); and utilizing the engine start/stop schedule responsive to receiving permission via the consent prompt to start the engine during key off.

21. The method of claim 16, further comprising:

detecting presence of the plurality of connected user devices during key on of the vehicle; and charging the LV battery to a level of SoC exceeding a default key off SoC of the LV battery, to increase the expected SoC of the LV battery during key off.

22. The method of claim 16, further comprising displaying a settings interface to an HMI, the settings interface allowing for configuration of one or more of:

a start time of the engine for the engine start/stop schedule;

a run time of the engine for the engine start/stop schedule;

a SoC to charge the LV battery; and/or an option to charge the connected user devices as much as possible without starting the engine.

23. The method of claim 16, further comprising:

displaying, to an HMI, for each of the plurality of connected user devices, a SoC to charge the respective connected user device.

24. A non-transitory computer-readable medium comprising instructions for charging a user device that, when executed by one or more controllers of a vehicle, cause the one or more controllers to perform operations including to:

estimate a depletion amount of energy required to charge a plurality of user devices connected to one or more device ports of a vehicle based on a sum of state of charge (SoC) of device batteries of the plurality of connected user devices;

responsive to an expected SoC of a LV battery of the vehicle after providing the depletion amount of energy exceeding a calibrated threshold amount of energy of the LV battery, charge the plurality of connected user devices during key off;

responsive to the expected SoC exceeding the calibrated threshold amount of energy and the vehicle being unauthorized to start an engine of the vehicle, charge the plurality of connected user devices during key off until the LV battery reaches the calibrated threshold amount of energy; and otherwise, utilizing an engine start/stop schedule defining a time to start the engine of the vehicle and a duration of run time for the engine to generate additional energy to charge the plurality of connected user devices to ensure the LV battery remains above the calibrated threshold amount of energy.

25. The medium of claim 24, further comprising instructions that, when executed by the one or more controllers, cause the one or more controllers to perform operations including to:

display, to an HMI, a plurality of options in the engine start/stop schedule, each option indicating a different device SoC level or amount of time to charge each of the plurality of connected user devices;

receive a selection of one of the plurality of options; and utilize the engine start/stop schedule to charge the plurality of connected user devices based on the selected one of the plurality of options.

* * * * *